Patented Feb. 17, 1942

2,273,484

UNITED STATES PATENT OFFICE 2,273,484

PROCESS FOR MANUFACTURING SYNTHETIC RUBBER FROM FURFUROL

Henri Martin Emmanuel Guinot, Niort, France, assignor to Les Usines de Melle, Melle, Deux-Sevres, France, a body corporate of France No Drawing. Application December 30, 1936, Serial No. 118,364. In France January 3, 1936

10 Claims. (Cl. 260—93)

This invention relates to the manufacture from furfurol of synthetic rubber and intermediate products valuable for the synthesis.

It is already known to prepare butadiene—i. e. an initial substance that is suitable for producing a synthetic rubber of good quality—by catalytic dehydration of tetrahydrofurane. The reaction may be represented in the following manner:—

However, this reaction has not hitherto been utilised industrially; this is due to the fact that tetrahydrofurane is a rare and expensive product. As a matter of fact, it is obtained along with other products by (1) catalytic reduction of furane which is itself obtained from the (2) pyrogenous decomposition of pyromucic acid. The latter substance is obtained in a rather poor yield by the oxidation of furfurol by permanganate or, better, by (3) hydration of furfurol by caustic soda by the Cannizaro method in accordance with the equation

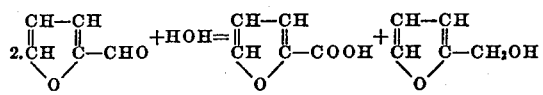

Although it is true that this reaction gives good yields (90%) of the two substances, there remains the fact that only one molecule of pyromucic acid is obtained from two molecules of furfurol, in other words only half the product obtained is the desired one. Accordingly, as the result of this method of working, the tetrahydrofurane, being the product of the last stage of a series of three reactions each giving a rather poor yield, is an expensive product as stated above.

The present invention has as its main object a process for the production of synthetic rubber, which process comprises passing through piperylene as an intermediate product. This piperylene or pentadiene is obtained by dehydration of tetrahydromethylfurane which is itself prepared by catalytic hydrogenation of furfurol.

One of the characteristic features of the invention consists in the carrying out of the hydrogenation of the furfurol in two stages. In the first stage, furfurol vapours are first of all passed over a catalyst—e. g. copper—which is incapable of causing the hydrogenation of the furane nucleus, and the furfurol is thus converted into methylfurane by passing through the furfuryl alcohol stage as has been shown in the specification of U. S. Patent No. 1,739,919.

Such reaction is carried out almost quantitatively as follows:

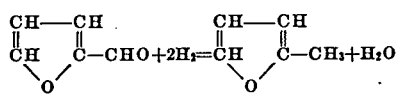

In the second stage, the methylfurane obtained is passed over a catalyst—e. g. reduced nickel—which is capable of causing the hydrogenation of the nucleus. If the work is carried out at a low temperature, e. g. 120° C. there is an almost exclusive formation of tetrahydromethylfurane with a yield of the order of 85 per cent. However, there is observed the formation of a small quantity of other valuable products such as methylpropyl ketone (pentanone) and methylpropyl carbinol (pentanol) by the opening up of the furane nucleus, as shown by the following equations:

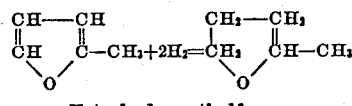
Tetrahydromethylfurane

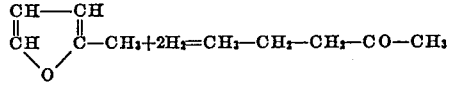
Pentanone

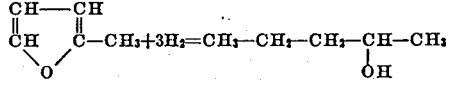
Pentanol

The pentanone and the pentanol formed are solvents of industrial value and, consequently, do not burden the cost price of the tetrahydromethylfurane obtained as the principal product. The latter substance is separated by any suitable means, for example by distillation.

The tetrahydromethylfurane can then be dehydrated by catalytic action to form piperylene by passing it over certain furnace-heated oxides or salts in accordance with a process similar to that which is employed for the production of olefines from alcohols. Thus the tetrahydromethylfurane may be passed over aluminium phosphate heated in a furnace at 350° C. The distillate obtained after catalysis separates into two layers which are treated to separate piperylene which boils at 42° C. and the density of which ($d_4^{25}$) is 0.679. Piperylene is obtained with a yield of from 85 to 90 per cent in accordance with the equation

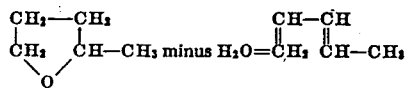

There is a formation of a very small quantity of heavy products which cannot be converted into rubber.

The aluminium phosphate may be replaced by any other substance used for the catalytic dehydration of alcohols—e. g. by kaolin, alumina, acid sodium phosphates, phosphoric acid carried by active charcoal, etc. In each case the temperature that is most suitable for a high yield must be observed.

Piperylene is converted into synthetic rubber by the usual methods of polymerisation, for example by moderate heating in the presence of sodium wire.

What I claim is:

1. A process of manufacturing synthetic rubber, comprising converting furfurol into methylfurane, converting the methyl furane into tetrahydromethylfurane, converting the tetrahydromethylfurane into piperylene, and finally converting the piperylene into synthetic rubber.

2. The process of manufacturing synthetic rubber according to claim 1, wherein the conversion of the tetrahydromethylfurane to piperylene is effected by dehydration with the aid of a dehydrating catalyst.

3. The preparation of piperylene consisting in catalytically dehydrating tetrahydromethylfurane.

4. The process of manufacturing synthetic rubber consisting in converting tetrahydromethylfurane into piperylene and polymerising the piperylene.

5. A process of manufacturing synthetic rubber from furfurol, including the steps of converting furfurol into methylfurane, converting the methyl furane into tetrahydromethylfurane, converting the tetrahydromethylfurane into piperylene and polymerizing the piperylene to form synthetic rubber.

6. A process of manufacturing synthetic rubber from furfurol including the steps of converting furfurol into methylfurane catalytically with the aid of a catalyst incapable of causing hydrogenation of the nucleus, converting the methyl furane into tetrahydromethylfurane, and converting the tetrahydromethylfurane into piperylene.

7. A process of manufacturing synthetic rubber from furfurol including the steps of converting furfurol into methylfurane with the aid of copper as a catalyst, converting the methyl furane into tetrahydromethyl furane, and converting the tetrahydromethylfurane into piperylene.

8. A process of manufacturing synthetic rubber from furfurol including the steps of converting furfurol into methylfurane with the aid of a catalyst incapable of hydrogenating the nucleus of the furfurol, then hydrogenating the methylfurane with the aid of a catalyst capable of hydrogenating the nucleus so as to form tetrahydromethylfurane, and then converting the latter into piperylene.

9. A process of manufacturing synthetic rubber from furfurol including the steps of converting methylfurane into tetrahydromethylfurane by hydrogenation using reduced nickel as catalyst, and then converting the tetrahydromethylfurane into piperylene.

10. A process of manufacturing synthetic rubber from furfurol including the steps of converting furfurol into methyl furane by hydrogenation with the aid of copper as a catalyst, converting methylfurane into tetrahydromethylfurane by hydrogenation with nickel as a catalyst employing a temperature of the order of 120° C., and then converting the tetrahydromethylfurane into piperylene by dehydration with the aid of a dehydrating catalyst.

HENRI MARTIN EMMANUEL GUINOT.

Certificate of Correction

Patent No. 2,273,484.  February 17, 1942.

HENRI MARTIN EMMANUEL GUINOT

It is hereby certified that error appears in the printed specification of the above numbered patent requiring correction as follows: Page 1, second column, line 23–24, for that portion of the formula reading

and that the said Letters Patent should be read with this correction therein that the same may conform to the record of the case in the Patent Office.

Signed and sealed this 14th day of April, A. D. 1942.

[SEAL]

HENRY VAN ARSDALE,
*Acting Commissioner of Patents.*